Nov. 5, 1968  L. A. STROMMEN  3,409,740
COIN TELEPHONE CONTROL APPARATUS
Filed Sept. 22, 1965
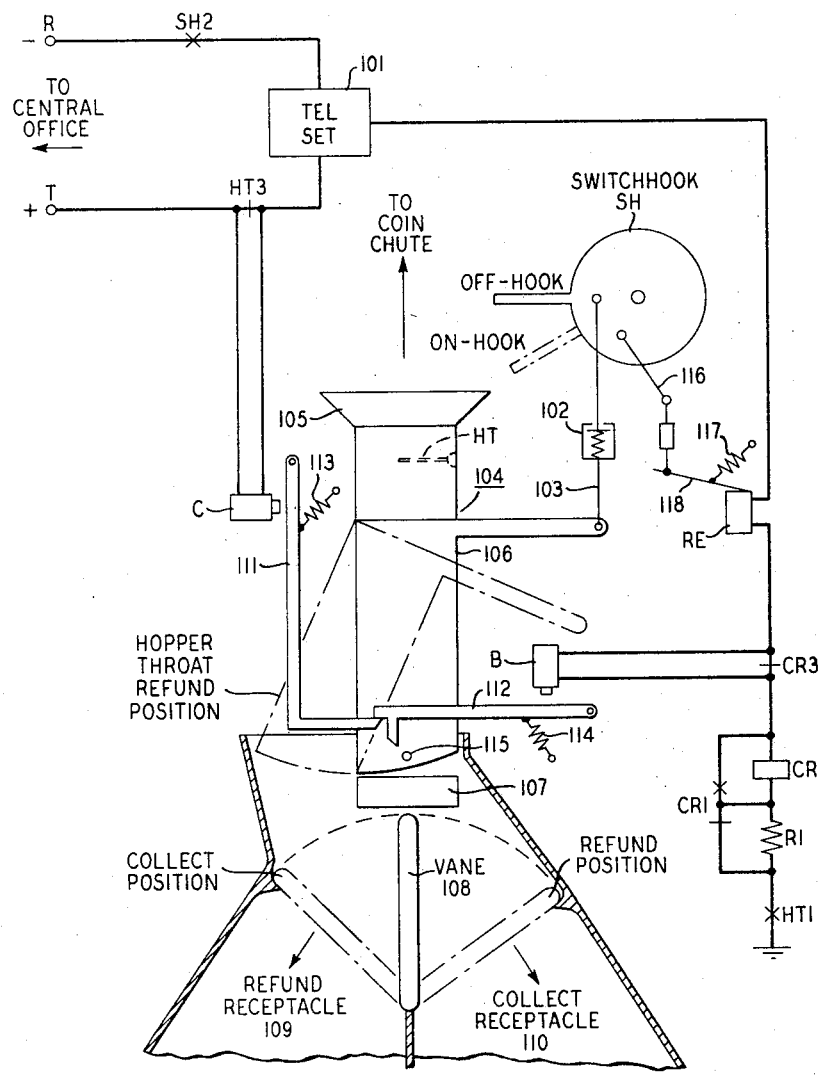
INVENTOR
L. A. STROMMEN
BY EJOlmsted
ATTORNEY

United States Patent Office

3,409,740
Patented Nov. 5, 1968

3,409,740
COIN TELEPHONE CONTROL APPARATUS
Lawrence A. Strommen, Indianapolis, Ind., assignor to Bell Telephone Laboratories, Incorporated, New York, N.Y., a corporation of New York
Filed Sept. 22, 1965, Ser. No. 489,229
12 Claims. (Cl. 179—6.3)

ABSTRACT OF THE DISCLOSURE

A coin control mechanism for coin operated telephones providing automatic refunding of deposited coins if the coins are deposited either while the receiver is on-hook or before recognition of a service request by the central office equipment.

---

This invention relates to coin control mechanisms for coin operated telephones and more particularly to coin refund arrangements.

In coin operated telephones now in general public use the coin control apparatus includes a container or hopper that serves as a temporary storage for all deposited coins. The bottom of the hopper is normally closed by a trap device operated by a coin relay. When the coin relay is operated by a pulse applied over the connecting telephone line from the associated central office, the trap opens and all coins in the hopper drop through, either to a refund channel or to a collect channel depending upon the position of a pivotally operable vane member located below the trap. The vane is also operated by the coin relay, its direction of pivotal movement being determined by the polarity of the applied coin relay pulse.

In coin telephones of the type described, mechanical means are provided to ensure the automatic refund of deposited coins that are less in value than the initial rate, the initial rate being the minimum amount required to obtain service. If, however, coins equal to or in excess of the initial rate are deposited, refund action must be initiated by the central office. Accordingly, if a customer places the set in the off-hook condition, deposits the initial rate of a dime, for example, and then places the set in the on-hook condition before recognition of the request for service has occurred at the central office, the customer receives neither service nor a refund.

The situation described is generally caused by extremely heavy traffic conditions, or by similar unusual circumstances that preclude prompt central office recognition of pay telephone service requests. Although refund failures of this type occur only infrequently, they do constitute a source of occasional annoyance to pay telephone customers and thus tend to reduce the attractiveness of pay telephone service.

Accordingly, a general object of the invention is to improve coin control mechanisms for coin operated telephones.

A specific object is to enhance the reliability of coin refund arrangements for coin telephones.

Another object is to ensure proper coin refunds to pay telephone customers irrespective of the absence of an early recognition of a service request by the associated central office.

A further object is to ensure proper coin refunds to pay telephone customers irrespective of the value of the deposited coins in relation to the initial rate and irrespective of whether coins are deposited in the off-hook or on-hook condition.

These and other objects are achieved in accordance with the principles of the invention in one illustrative embodiment wherein refund action in a coin operated telephone is controlled, in the absence of central office recognition of a service request, by the telephone switchhook mechanism in combination with additional electromechanical devices and a uniquely designed coin hopper mechanism. One aspect of the invention involves a coin hopper with a lower or throat portion arranged for pivotal action permitting it to be positioned to one side of the conventional coin trap so that under preselected conditions all coins deposited drop directly through the hopper into the coin refund channel. In accordance with the invention, a mechanical linkage actuated by the telephone switchhook normally holds the hopper throat in the described offset position so long as the set is in the on-hook condition.

Another aspect of the invention involves an electromechanical latching arrangement that locks the pivotal throat portion of the coin hopper in position over the coin trap if service is provided when the set is off-hook. The coin hopper is held in that position after hangup until a refund or collect pulse is applied from the central office. The pulse is also utilized, in accordance with the invention, to unlock the throat latching mechanism. The hopper swings clear of the coin trap and the disposition of the coins in the hopper is determined by the position of the vane. The hopper at that point is properly positioned for the next call sequence or refund in the event that coins are deposited with the set in the on-hook condition.

A further aspect of the invention concerns the power supplied for the operation of the latching mechanism. Power normally available to the tip lead of a coin telephone set is fully utilized by the coin relay and hopper mechanism, and the insertion of any additional resistance in series with the tip lead would accordingly reduce the maximum loop length. To avoid such a reduction, power available in the tip lead for the operation of the electromechanical hopper latching mechanism is supplied, in accordance with the invention, by applying battery to the tip lead in the central office, +48 volts for example, in place of the conventional tip lead ground, whereas the ring lead is connected conventionally to −48 volt battery.

Accordingly, one feature of the invention is a coin operated telephone employing a coin return mechanism that is controlled in part by the operation of the switchhook to the end that all coins deposited with the phone in either the on-hook or off-hook condition are automatically refunded in the absence of recognition by the associated central office of a request for service.

Another feature pertains to a pivotally positionable coin hopper mechanism, controlled in part by the telephone switchhook in combination with an electromechanical latching mechanism, that enables coins deposited in the hopper to be refunded under preselected conditions, irrespective of whether the coin hopper trap has been opened.

These and other objects and features of the invention will be fully apprehended from the following detailed description of an illustrative embodiment of the invention and from the appended drawing in which the single figure shows a combination mechanical and electrical schematic diagram of the key features of a coin operated telephone in accordance with the invention.

*Mechanism and circuit description*

In the drawing a conventional telephone set speech network 101 is connected across ring and tip leads R and T. Connection through to a central office, not shown, is provided by a switchhook make contact SH2. A conventional path from the telephone speech network 101 to ground is provided through reset electromagnet RE, break contact CR3 of coin relay CR, the coil of coin relay CR, resistor R1 and hopper trigger make contact HT1. The coin relay CR and resistor R1 are shunted, respectively, by make and break contact CR1.

A coin hopper 104 includes an upper or fixed portion 105 and a lower portion 106 adapted for pivotal movement as indicated by the position shown in broken lines. Pivotal movement of the lower portion 106 of coin hopper 104 is effected through a linkage 103 and a spring 102 actuated by the switchhook SH. In its normal or unpivoted position, the lower portion or throat 106 of hopper 104 is positioned in line with a coin trap 107. In that position coin trap 107 seals off the lower portion of throat 106 so that the deposited coins are retained within hopper 104. Trap 107 is opened by the operation of coin relay CR through linkages, not shown.

A vane member 108 is positioned directly below the trap 107 and, as shown by the broken line presentation, has two possible extreme positions of operation, as well as a neutral or mid-position. With vane 108 operated to the left, the refund receptacle 109 is sealed off and coins falling through the trap 107 are directed to the collect receptacle 110. With vane 108 in the extreme right position, coins released by trap 107 are directed to the coin refund receptacle 109. In accordance with conventional practice, vane 108 is operated by coin relay CR through mechanical linkages, not shown, at a point in time that slightly precedes the operation of the trap 107. Such operation and structure is well known in the art as shown, for example, by J. P. Juley in Patent 1,470,747, issued Oct. 16, 1923.

In accordance with the invention, a mechanical latch member 112, biased by a spring 114, is provided to lock the hopper throat 106 in a vertical position over the trap 107 by bearing against the pin 115. The latch 112 may be held in a nonoperated position, as shown by latch 111 which is biased by spring 113 and which is adapted for pivotal movement in response to the operation of a solenoid C. Solenoid C is shunted by hopper trigger break contact HT3. Latch 112 is pivotally responsive to the operation of a solenoid B which is shunted by break contact CR3 of the coin relay CR.

In order to simplify the disclosure and to clarify the presentation of those elements that constitute features of the invention, many conventional portions of the coin control circuitry and mechanism have been omitted or are shown in skeletonized form. Details of both the mechanism and circuitry of conventional coin-operated telephones are well known in the art and are disclosed, for example, by E. R. Andregg and L. A. Strommen in Patent 3,146,312, issued Aug. 25, 1964, and J. P. Juley in the patent cited above.

*Operation*

With switchhook SH on-hook and in the absence of any coins stored in hopper 104, the hopper throat 106 is pivoted to the left, as shown by the broken line presentation, under the action of the switchhook connecting linkage 103. Accordingly, so long as switchhook SH remains on-hook, coins deposited in the coin chute, not shown, are directed into the upper portion 105 of hopper 104 and thence through the pivoted hopper throat 106, clear of the trap 107, and to the refund receptacle 109. Refund occurs in the manner indicated irrespective of the value of the deposited coins.

When the handset, not shown, is lifted and switchhook SH moves to its off-hook position, linkage 103 restores the hopper throat 106 to its vertical or nonpivoted position in alignment with the closed coin trap 107. The hopper trigger HT, which is operated by the deposit of any coin, enables solenoid C through the operation of break contact HT3 and completes a path to ground by the operation of hopper trigger make contact HT1. If no service is provided before hangup, which is to say that there has been no recognition by the central office of a request for service as demonstrated by the application of ground to the circuit in the manner indicated, switchhook SH is returned to its on-hook position, hopper throat 106 is pivoted to the left through the action of spring 102 and linkage 103 and coins stored in hopper 104 are directed to the refund receptacle 109.

If service is provided, however, and coins at least equal in value to a preselected initial rate such as ten cents, for example, have been deposited in the hopper 104, a different action sequence occurs. Positive battery, which may be on the order of 48 volts for example, is applied at the central office to tip lead T. With hopper trigger break contact HT3 operated, solenoid C is energized and latch 111 is pivoted away from its latching position, thus permitting spring 114 to draw latch 112 into a latching position against pin 115 to lock hopper throat 106 in its vertical position.

When the customer's call has been completed and the receiver is hungup, spring 102 of linkage 103 is compressed since the hopper 106 is locked in position by latch 112. When the central office applies a pulse to tip lead T to operate the coin relay CR, hopper trigger HT is reset by a conventional reset mechanism, not shown. Accordingly, break contact HT3 closes, releasing solenoid C. Coin relay CR, in operating, opens break contact CR3 thus permitting solenoid B to operate. Latch 112 is thus pivoted upwardly against the restraining force of spring 114 and is locked in its raised position by latch 111 which pivots to the right under the force of spring 113. Hopper throat 106 is thus permitted to pivot to its refund position, shown in broken lines. Irrespective of the position of throat 106, however, it is the position of vane 108 that determines whether the coins released from the hopper 104 will be collected or refunded, so long as coin relay CR remains in the operated position.

In accordance with the invention, switchhook SH moves hopper throat 106 positively to its vertical position through linkage 103 but movement in the opposite direction is spring coupled through spring 102 in order to allow the switchhook plunger to move to the on-hook position even though hopper throat 106 is locked in position by latch 112.

Under certain conditions it is possible for the coin totalizer mechanism, not shown, to have deposit information stored in it, although no coins are stored in the hopper. This condition may occur, for example, if the customer deposits coins while the receiver is on-hook or in any equivalent condition. In order to avoid free service, switchhook SH is arranged, in accordance with the invention, to depress the armature 118 of reset electromagnet RE by a linkage 116. This action causes an antifraud latch, not shown, to fall in place thus preventing the use of the dial. Totalizer mechanisms equipped with antifraud latches are well known in the art and are shown, for example, by E. R. Andregg and L. A. Strommen in Patent 3,146,312, issued Aug. 25, 1946. The antifraud latch normally maintains the armature 118 of reset electromagnet RE in the operated position until the totalizer shaft has been returned to a normal or index position at the termination of the readout cycle. Thus, with the armature of the reset electromagnet RE locked operated, the rate contact latch of the totalizer is precluded from latching up the rate contacts and accordingly the dial pulse contacts remain shunted until a full initial rate has been deposited without the refund of any part thereof. The antifraud latch is operated by a cam driven by the totalizer shaft. The cam includes a camming lobe that trips the antifraud latch when the totalizer shaft is at its normal or index position.

With the antifraud latch actuated as described, with coin deposit information stored in the totalizer and with the hopper trigger HT tripped, the central office will eventually observe a service request, connect the tip lead T, reset the totalizer through the operation of reset electromagnet RE, observe a disconnect and send out a refund pulse. This pulse resets the hopper trigger contacts and the set is then in the proper condition for the next customer.

What is claimed is:

1. Coin telephone control apparatus comprising, in combination, a coin collector mechanism for selectively directing deposited coins into a refund chute or into a collect chute; means responsive to the on-hook condition of the telephone switchhook for controlling said mechanism to direct all coins deposited during said condition into a refund chute; and means responsive to the transition from an off-hook condition to said on-hook condition, provided that no central office recognition of a service request occurred during said off-hook condition, for controlling said mechanism to direct into said refund chute all coins deposited during said off-hook condition.

2. Coin control apparatus for a coin operated telephone set comprising, in combination, a first receptacle for all deposited coins; a second receptacle for refunded coins; a third receptacle for collected coins; means operative only during the on-hook condition of said set for directing all coins deposited during said condition from said first receptacle to said second receptacle; and means responsive to a transition from an off-hook condition of said set to said on-hook condition, provided that no recognition of service indication occurred during said off-hook condition, for directing all coins deposited during said off-hook condition from said first receptacle to said second receptacle.

3. Coin control apparatus for a coin operated telephone set comprising, in combination, a first receptacle for all deposited coins; a second receptacle for refunded coins; a third receptacle for collected coins; means operative only during the on-hook condition of said set for directing into said second receptacle all coins deposited in said first receptacle during said condition; and means within said set, independent of any outside control or signal, responsive to the transition of said set from an off-hook condition to said on-hook condition, provided that no recognition of service indication occurred during said off-hook condition, for directing into said second receptacle all coins deposited into said first receptacle during said off-hook condition.

4. Coin control apparatus for a coin operated telephone set comprising, in combination, a first receptacle for all deposited coins; a second receptacle for refunded coins; a third receptacle for collected coins; first means responsive to a central office coin refund signal or to a central office coin collect signal for directing coins from said first receptacle into said second or third receptacle, respectively; second means independent of any external signal source operative only during the on-hook condition of said set for directing into said second receptacle all coins deposited in said first receptacle during said on-hook condition; third means, independent of any external signal source, responsive to the transition of said set from an off-hook condition to said on-hook condition, provided that no recognition of service indication occurred during said off-hook condition, for directing into said second receptacle all coins deposited into said first receptacle during said on-hook condition; and means responsive to said refund signal or to said collect signal applied during an on-hook condition of said set for shifting said first directing means to an operative position.

5. Coin control apparatus for a coin operated telephone set comprising, in combination, a hopper receptacle having an entrance portion and an exit portion for deposited coins; a coin relay; trap means for normally containing deposited coins within said hopper, said exit portion being normally positioned substantially over said trap means when said set is in an off-hook condition; a first channel for coins to be refunded; a second channel for coins to be collected; means responsive to the operation of said coin relay for opening said trap and for selectively directing coins in said hopper into said first channel or into said second channel; means independent of any external signal responsive to placing said set in an on-hook condition for shifting said exit portion from its normal position over said trap means to a position in correspondence with said first channel means whereupon coins deposited in said hopper are automatically refunded when hangup occurs irrespective of the closed condition of said trap means, provided that no signal indicia of a recognition of a service request was applied to said set after the deposit of said last named coins.

6. In a coin operated telephone set, in combination, a coin hopper having a fixed upper portion and a pivotally movable lower portion; a coin relay operatively responsive to a pulse from an outside source; a coin refund receptacle; a coin collect receptacle; a hopper trigger switch operatively responsive to the deposit of a coin in said hopper; a coin trap member operatively responsive to said relay for releasing coins from said hopper, said trap member being in juxtaposition to said lower portion of said hopper when said lower portion is in its normal or nonpivoted position; a vane member operatively responsive to said relay for directing coins released from said hopper by said trap into said refund or collect receptacle in accordance with the polarity of said pulse; means responsive, when said set is in an off-hook condition, to the recognition of a request for service as indicated by the application of a current pulse from an outside source, for locking said lower portion in said nonpivoted position; means responsive to placing said set in an off-hook condition, in the absence of a recognition of a request for service, for pivoting said lower hopper portion clear of said trap, whereby coins in said hopper are directed into said refund receptacle; and means jointly responsive to the application of a coin return pulse and to the placing of said set in an on-hook condition at the completion of a call, said lower portion being locked in said nonpivoted position, for unlocking said lower portion and pivoting said lower portion clear of said trap, the disposition of coins stored in said hopper being then determined by the position of said vane.

7. Apparatus in accordance with claim 6 wherein said locking means comprises a first mechanical latch.

8. Apparatus in accordance with claim 6 wherein said locking means comprises a first mechanical latch for locking said lower portion of said hopper in a nonpivoted position and a second mechanical latch for retaining said first latch in a nonoperated position.

9. Apparatus in accordance with claim 8 including a first solenoid operatively enabled by the operation of said coin relay for shifting said first latch from an operated to a nonoperated position and a second solenoid operatively enabled by the operation of said hopper trigger switch for shifting said second latch from its first latch retaining position.

10. In a coin operated telephone system including a coin operated telephone set connectable to a central office over tip and ring leads, coin operated telephone coin control apparatus comprising, in combination, a coin hopper having a pivotally mounted throat portion; a coin trap for closing off said throat portion of said hopper when said throat portion is in a normal or nonpivoted position; a coin refund receptacle; a coin return receptacle; a coin deflector vane for directing coins released from said hopper into said refund receptacle or into said collect receptacle; means responsive to a current pulse from said central office applied to said tip lead when said set is in the off-hook condition for latching said throat portion of said hopper in said nonpivoted position; means responsive to a current pulse from said central office applied to said ring lead when said set is in the on-hook condition, said throat being latched in said nonpivoted position, for unlatching said throat, whereupon said throat is pivoted clear of said coin trap, the disposition of coins in said hopper being determined by the position of said vane.

11. In a coin operated telephone set, coin control apparatus comprising, in combination, a coin hopper having a pivotal throat portion; a coin relay; a coin trap, normally retaining deposited coins in said hopper, responsive to said coin relay for releasing coins from said hopper; a vane responsive to said coin relay for directing said coins released from said hopper for refund or collection; means responsive to said set being placed in an on-hook condition for pivoting said throat clear of said trap whereby coins in said trap are refunded provided said vane is in its unoperated or neutral position; means responsive to an applied signal from a source outside of said set for disabling said pivoting means; and means responsive to the operation of said coin relay for releasing said disabling means; whereupon said throat portion is shifted to its pivoted position.

12. Apparatus in accordance with claim 11 wherein said disabling means comprises a first mechanical latch; wherein said releasing means comprises a first solenoid, operatively responsive to the operation of said coin relay, for lifting said first latch and means comprising a second solenoid and a second latch operatively responsive thereto for holding said first latch in an unlatched position.

No references cited.

KATHLEEN H. CLAFFY, *Primary Examiner.*

D. L. STEWART, *Assistant Examiner.*